United States Patent
Sasaki

(10) Patent No.: US 8,564,933 B2
(45) Date of Patent: Oct. 22, 2013

(54) ELECTRODE FOR LITHIUM ION CAPACITOR AND LITHIUM ION CAPACITOR

(75) Inventor: Tomokazu Sasaki, Kanagawa (JP)

(73) Assignee: Zeon Corporation, Tokyo (JP)

( * ) Notice: Subject to any disclaimer, the term of this patent is extended or adjusted under 35 U.S.C. 154(b) by 203 days.

(21) Appl. No.: 13/061,047

(22) PCT Filed: Aug. 27, 2009

(86) PCT No.: PCT/JP2009/064954
§ 371 (c)(1),
(2), (4) Date: Feb. 25, 2011

(87) PCT Pub. No.: WO2010/024327
PCT Pub. Date: Mar. 4, 2010

(65) Prior Publication Data
US 2011/0157773 A1    Jun. 30, 2011

(30) Foreign Application Priority Data

Aug. 28, 2008 (JP) ................................ 2008-220384

(51) Int. Cl.
*H01G 9/155* (2011.01)
(52) U.S. Cl.
USPC ........................................ 361/502; 361/303
(58) Field of Classification Search
USPC ................................. 361/502, 503
See application file for complete search history.

(56) References Cited

U.S. PATENT DOCUMENTS

| | | |
|---|---|---|
| 6,917,094 B2 | 7/2005 | Murakami et al. |
| 7,206,190 B2 | 4/2007 | Murakami et al. |
| 2004/0130038 A1 | 7/2004 | Murakami et al. |
| 2007/0177332 A1 | 8/2007 | Kobayashi et al. |
| 2009/0027831 A1* | 1/2009 | Tasaki et al. ............... 361/523 |
| 2009/0097189 A1* | 4/2009 | Tasaki et al. ............... 361/512 |
| 2009/0154064 A1* | 6/2009 | Tasaki et al. ............... 361/505 |

FOREIGN PATENT DOCUMENTS

| | | |
|---|---|---|
| JP | 2004-186218 | 7/2004 |
| JP | 2005-136401 A | 5/2005 |
| JP | 2006-338963 A | 12/2006 |

OTHER PUBLICATIONS

International Preliminary Report on Patentability for Application No. PCT/JP2009/064954, dated Apr. 12, 2011.
International Search Report for PCT/JP2009/064954, mailed on Oct. 6, 2009.

* cited by examiner

*Primary Examiner* — Eric Thomas
(74) *Attorney, Agent, or Firm* — Birch, Stewart, Kolasch & Birch, LLP

(57) ABSTRACT

Disclosed is an electrode for a lithium ion capacitor having excellent electrode strength, wherein the internal resistance can be decreased and the power density can be increased. The lithium ion capacitor comprises an electrode composition layer, comprising an electrode active material, conductive material and a binder, and a collector, wherein a conductive adhesive layer comprising carbon particles is provided between the electrode composition layer and the collector.

12 Claims, No Drawings

ELECTRODE FOR LITHIUM ION CAPACITOR AND LITHIUM ION CAPACITOR

TECHNICAL FIELD

The present invention relates to an electrode for lithium ion capacitor and a lithium ion capacitor. More precisely, the present invention relates to an electrode for lithium ion capacitor and a lithium ion capacitor having excellent electrode strength, capable of decreasing an internal resistance and increasing a power density.

BACKGROUND OF THE INVENTION

A lithium ion capacitor of small size and light weight, having high energy density and capable to discharge and charge repeatedly, has been increased in demand rapidly with using its property. Also, the lithium ion capacitor is expected to utilize from a small size usage such as a cellar phone and a laptop computer to large size usage as adapted for a car because of its high energy density and power density. Therefore, further improvement such as lower resistance, high capacity, high electric strength, improving mechanical characteristic and the like is required to the lithium ion capacitor, according to enlargement of use purposes and development.

The lithium ion capacitor comprises a polarizable electrode at a positive electrode, a non-polarizable electrode at a negative electrode, operating voltage is raised by using an organic electrolyte solution, and an energy density can be improved. However, on the other hand, there were problems that a contact resistance of a collector, having openings which penetrate onside to other side, and electrode composition layer is larger so that an internal resistance is larger.

Hence, in order for decreasing the internal resistance, it has been suggested for coating a conductive paint on a surface of the collector (Patent Document 1). An electrode for lithium ion capacitor in the patent document 1 is obtained by coating a conductive paint on a collector having through holes, and coating slurry for electrode composition layer composed of electrode active material, conducting material and binder thereon. However, for this electrode, the decreasing the internal resistance was insufficient.

PRIOR ART

Patent Document

Patent Document 1: Japanese Patent No. 4015993 (corresponds to the specification of U.S. Pat. No. 6,862,168)

SUMMARY OF THE INVENTION

Problems to be Solved by the Invention

A purpose of the present invention is to provide an electrode for lithium ion capacitor having excellent electrode strength and to provide a lithium ion capacitor for reducing an internal resistance and for increasing a power density.

Means for Solving the Problems

In order to achieve the above mentioned purpose, as a result of intentional study by the present inventors, they have found that electrode strength of the electrode for lithium ion capacitor can be improved, an internal resistance of the lithium ion capacitor can be decreased and the power density can be increased by forming a conductive adhesive layer comprising carbon particles between the electrode composition layer and the collector of the electrode for lithium ion capacitor composed of an electrode composition layer which includes an electrode active material, a conductive material, a binder, and a collector.

The present inventors have achieved the present invention based on the knowledge.

Thus, according to the present invention, an electrode for lithium ion capacitor composed of an electrode composition layer includes an electrode active material, a conductive material and a binder, and a collector wherein an electrode adhesive layer comprising carbon particles is formed between the electrode composition layer and the collector is provided.

Also, according to the present invention, a lithium ion capacitor comprising a positive electrode, a negative electrode, an electrolyte solution, and a separator wherein said positive and negative electrodes are said electrode can be provided.

Effects of the Invention

The electrode for lithium ion capacitor of the present invention is capable to easily produce a lithium ion capacitor having excellent electrode strength, low insulation resistance and high power density. The lithium ion capacitor of the present invention can be used for various purposes of use, such as application for a back-up power source of memory for personal computer, a cellular phone and the like, a power source for instantaneous power failure of personal computer and the like, electric vehicles or hybrid vehicles, solar power generating energy storage system used with a solar cell, a load leveling power source combined with a battery and the like.

BEST MODE FOR WORKING THE INVENTION

The electrode for lithium ion capacitor of the present invention is composed of an electrode composition layer which includes an electrode active material, a conductive material and a binder, and a collector, wherein a conductive adhesive layer comprising carbon particles is provided between the electrode composition layer and the collector. Below, a binder used for the electrode composition layer is sometimes referred to as "electrode composition layer binder" and a binder used for following mentioned conductive adhesive layer is sometimes referred to as "conductive adhesive layer binder".

(Collector)

Materials of a collector used for the lithium ion capacitor of the present invention are, for example, metal, carbon, conductive high polymer and the like can be used, the metal is used preferably. As for the metal for the collector, in normally, aluminium, platinum, nickel, tantalum, titanium, stainless steel, copper, other alloys and the like are used. Among them, in view of conductivity and electric strength, it is preferable to use aluminium or aluminium alloy.

Although a shape of the collector used for the electrode for the lithium ion capacitor of the present invention is that collectors such as a metallic foil, a metallic edged foil, a collector such as an expanded metal, a punching metal and a net shaped having through holes are exemplified, however, in view of reducing diffusion resistance of electrolyte ion and improving the power density of the lithium ion capacitor, a collector having through hole is preferable, among them, the expanded metal and punching metal are preferable particularly due to excellent electrode strength. In the present invention, a collector having through holes means a collector having through holes penetrate one side surface to other side surface.

A ratio of through holes of the collector having through hole preferably used for the electrode for lithium ion capacitor of the present invention is 10 to 80 area %, preferably 20 to 60 area %, more preferably 30 to 50 area %. When the through holes ratio is within this range, the diffusion resistance of the electrolyte solution is reduced so that the internal resistance of the lithium ion capacitor is reduced. An average diameter of the through hole is normally 0.1 to 5000 μm, preferably 0.5 to 3000 μm, more preferably 1 to 1000 μm. Here, the average diameter of the hole is a value determined by a formula (X+Y)/2 from a long axial direction length X of the hole and a short axial direction Y of the hole.

A thickness of the collector used for the electrode for lithium ion capacitor of the present invention is 5 to 100 μm, preferably 10 to 70 μm, particularly preferably 20 to 50 μm.

A conductive adhesive layer comprising carbon particles is formed between the collector and the electrode composition layer.

(Carbon Particles)

Carbon particles used for the electrode for the lithium ion capacitor of the present invention is particles composed of carbon only or composed of substantially carbon only. As for specific examples thereof, graphite having high conductivity by existence of delocalized π electron (specifically natural graphite, artificial graphite and the like); carbon black which is spherical aggregation wherein a turbulent layer structure is formed by assembled several layers of micro crystallite of carbon (specifically, acetylene black, ketchen black, other furnace black, channel black, thermal lamp black and the like); carbon fiber and carbon whisker and the like are exemplified, among them, graphite or carbon black is particularly preferable in view of that the carbon particles of the conductive adhesive layer can be charged as high density, electron transfer resistance can be reduced and the internal resistance of the lithium ion capacitor can be reduced further.

Although the carbon particles used for the electrode for lithium ion capacitor of the present invention may be used as alone, it is particularly preferable to use combination of two kinds. Specifically, combinations of graphite and carbon black; graphite and carbon fiber; graphite and carbon whisker; carbon black and carbon fiber; carbon black and carbon whisker and the like are exemplified, preferably combinations of graphite and carbon black; graphite and carbon fiber; carbon black and carbon fiber, particularly preferably graphite and carbon black; graphite and carbon fiber. When the carbon particles are these combinations, the electron transfer resistance is reduced further, and the internal resistance of the lithium ion capacitor is reduced further, because the carbon particles of the conductive adhesive layer are charged as high density.

The electric resistivity of the carbon particles used for the electrode for lithium ion capacitor of the present invention is preferably 0.0001 to 1 Ω·cm, more preferably 0.0005 to 0.5 Ω·cm, particularly preferably 0.001 to 0.1 Ω·cm. When the electric resistivity of the carbon particles is within this range, the electron transfer resistance of the conductive adhesive layer is reduced further so that the internal resistance of the lithium ion capacitor can be reduced further. Here, the electric resistivity $\rho(\Omega\cdot cm)=R\times(S/d)$ is calculated from that a resistance value $R(\Omega)$ convergent to a pressure which is measured with continuously pressing to the carbon particulate by using a powder resistance measuring system (MCP-PD51type; produced by DIA INSTRUMENTS CO., LTD), an area S (cm$^2$) of the pressed carbon particle layer and a thickness d(cm).

A volume average particle size of the carbon particles used for the electrode for lithium ion capacitor of the present invention is preferably 0.01 to 20 μm, more preferably 0.05 to 15 μm, particularly preferably 0.1 to 10 μm. When the average volume particle size is within this range, the electron transfer resistance is reduced further so that the internal resistance of the lithium ion capacitor can be reduced further, because the carbon particles of the conductive adhesive layer are charged as high density. Here, the volume average particle size is measured and calculated by a laser diffraction type particle size measuring apparatus (SALD-3100; produced by SIMADZU CORPORATION).

In the electrode for lithium ion capacitor of the present invention, the average volume particle distribution of the carbon particles used for the conductive adhesive layer is preferably bimodal. Specifically, it is preferably comprises carbon particles (A) having 0.01 μm or more and less than 1 μm, preferably 0.1 μm or more and 0.5 μm or less of volume average particle diameter and carbon particles (B) having 1 μm or more and 10 μm or less, preferably 1 μm or more and 5 μm or less of volume average particle diameter. When the volume average particle diameter of the carbon particles is bimodal, the electron transfer resistance is reduced because the carbon particles of the conductive adhesive layer are charged as high density so that the internal resistance of the lithium ion capacitor is reduced. Here, the volume average particle size is measured and calculated by a laser diffraction type particle size measuring apparatus (SALD-3100; produced by SIMADZU CORPORATION).

Bimodal distribution of the volume average particle size of the carbon particles means that at least two peaks are observed in the volume average particle size distribution which shows an occurrence frequency in a longitudinal axis and particle size in abscissa axis, it is preferable the peaks are observed in areas of 0.01 μm or more and less than 1 μm of the particle size and 1 μm or more and 10 μm or less, more preferably in areas of 0.1 μm or more and 0.5 μm or less and 1 μm or more and 5 μm or less, respectively.

A weight ratio of the two kinds of carbon particle (A) and carbon particles (B) which are preferably used for the electrode for lithium ion capacitor of the present invention is preferably 0.05 to 1 in proportional ratio (A)/(B), more preferably 0.1 to 0.8, particularly preferably 0.2 to 0.5. When the weight ratio of the two kinds of the carbon particles are within these ranges, the electron transfer resistance is reduced further, because the carbon particles of the conductive adhesive layer are charged as high density so that the internal resistance of the lithium ion capacitor can be reduced further.

Also, in said carbon particles, a weight ratio of carbon particulate (A') having its diameter is 0.01 μm or more and less than fpm and carbon particles (B') having its diameter is fpm or more and 10 μm or less is preferably 0.05 to 1 in proportional ratio (A')/(B'), more preferably 0.1 to 0.8, particularly preferably 0.2 to 0.5.

The conductive adhesive layer used for the electrode for the lithium ion capacitor of the present invention is comprises carbon particles as an indispensable component. The conductive adhesive layer used for the present invention preferably includes a binder in addition to the carbon particles. By including the binder in the conductive adhesive layer, binding property of the collector and an electrode composite layer is improved and the internal resistance is reduced so that the power density can be improved.

(Binder for Conductive Adhesive Layer)

There is no particular limitation for a binder for conductive adhesive layer preferably used for the electrode for lithium ion capacitor of the present invention, as far as it is a compound capable to bind the carbon particles each other. A preferable binder is a dispersion type binder having dispersion property to solvent. As for the dispersion type binder, polymer compound such as, fluoro polymer, diene polymer, acrylate polymer, polyimide, polyamide, polyurethane polymer and the like can be exemplified, the fluoro polymer, the diene polymer or acrylate polymer are preferable, the diene polymer or the acrylate polymer are further preferable, because an electric resistance can be increased and an energy density of the lithium ion capacitor can be increased.

The diene polymer is a homopolymer of a conjugated diene or a copolymer obtained by polymerizing a monomer mixture including the conjugated diene or a hydrogen additive thereof. A ratio of the conjugated diene in said monomer mixture is normally 40 wt % or more, preferably 50 wt % or more, more preferably 60 wt % or more. As for specific examples of the diene polymer, a conjugated diene homopolymer such as polybutadiene, polyisoprene and the like; aromatic vinyl/conjugated diene copolymer such as styrene/butadiene copolymer (SBR) that may be carboxy modified; vinyl cyanide/conjugated diene copolymer such as acrylonitrile/butadiene copolymer (NBR) and the like; hydrogenated SBR, hydrogenated NBR and the like are exemplified.

The acrylate polymer is a polymer obtained by polymerizing a monomer mixture including compound shown by a general formula (1): $CH_2=CR^1-COOR^2$ (in the formula, $R^1$ shows hydrogen atom or methyl group, $R^2$ is alkyl group or cycloalkyl group). As specific examples of the compounds shown by the general formula (1), acrylate such as ethyl acrylate, propyl acrylate, isopropyl acrylate, n-butyl acrylate, isobutyl acrylate, t-butyl acrylate, n-amyl acrylate, isoamyl acrylate, n-hexyl acrylate, 2-ethylhexyl acrylate, hexyl acrylate, nonyl acrylate, lauryl acrylate, stearyl acrylate and the like; methacrylate such as ethyl methacrylate, propyl methacrylate, isopropyl methacrylate, n-butylmethacrylate, isobutyl methacrylate, t-butyl methacrylate, n-amyl methacrylate, isoamyl methacrylate, n-hexyl methacrylate, 2-ethylhexyl methacrylate, octyl methacrylate, isodecyl methacrylate, lauryl methacrylate, tridecyl methacrylate, stearyl methacrylate and the like can be exemplified. Among these, the acrylate is preferably, the n-butyl acrylate and the 2-ethylhexyl acrylate are particularly preferable in view of that strength of an obtained electrode can be improved. A ratio of monomer unit derived from acrylate and/or methacrylate in the acrylate polymer is normally 50 wt % or more, preferably 70 wt % or more. When the acrylate polymer, wherein the ratio of the monomer unit derived from said acrylate and/or methacrylate is within said range, is used, heat resistance is high and an internal resistance of an obtained electrode for lithium ion capacitor can be reduced.

For said acrylate polymer, a polymerizable monomer comprising carboxylic acid group can be used in addition to the compounds shown by the general formula (1), as for specific examples, monomer comprising monobasic acid such as acrylic acid, methacrylic acid and the like; monomer comprising dibasic acid such as maleic acid, itaconic acid and the like can be exemplified. Among these, the monomer comprising dibasic acid is preferable, the itaconic acid is particularly preferable because binding property to the collector is improved, so that electrode strength can be improved. These monomer comprising monobasic acid and monomer comprising dibasic acid can be used as alone respectively or in combination of two kinds or more. An amount of the monomer comprising the carboxylic acid group in said monomer mixture when copolymerizing is normally 0.1 to 50 parts by weight, preferably 0.5 to 20 parts by weight, further preferably 1 to 10 parts by weight to 100 parts by weight of the compound shown by the generic formula (1). When the monomer unit comprising carboxylic acid group is within this range, the binding property with the collector is excellent so that the electrode strength of the obtained electrode can be improved.

The acrylate polymer may contain monomer unit derived from a polymerizable monomer comprising nitrile group in addition to the compound shown by the general formula (1). As for specific examples of the monomer comprising nitrile group, acrylonitrile, methacrylonitrile and the like can be exemplified, among them, the acrylonitrile is preferable, because binding property with the collector is excellent so that the electrode strength can be improved. An amount of the acrylonitrile in said monomer mixture when copolymerizing is normally 0.1 to 40 parts by weight, preferably 0.5 to 30 parts by weight, more preferably 1 to 20 parts by weight to 100 parts by weight of the compound shown by the generic formula (1). When the amount of the acrylonitrile is within this range, the binding property with the collector is excellent so that obtained electrode strength is improved.

Although a shape of the binder used for the conductive adhesive layer of the electrode for lithium ion capacitor of the present invention is not particularly limited, particulate is preferable because binding property with the collector is excellent, and it is possible to prevent capacity decreasing and deterioration by repeating charge and discharge of a produced electrode. As for the particulate binder, for example, particles of the binder dispersed in water such as latex and powder obtained by drying such dispersion are exemplified.

A glass transition temperature (Tg) of the binder used for the conductive adhesive layer of the electrode for lithium ion capacitor of the present invention is preferably 50° C. or below, further preferably −40 to 0° C. When the glass transition temperature (Tg) is within the range, binding property is excellent, the electrode strength is strong, flexibility is excellent by small amount of use so that the electrode density can be improved easily by a pressing process at the time of providing electrode.

When the binder used for the conductive adhesive layer of the electrode for lithium ion capacitor of the present invention is particulate, although there is no particular limitation for a number average particle size thereof, the number average particle size is normally 0.0001 to 100 μm, preferably 0.001 to 10 μm, more preferably 0.01 to 1 μm. When the number average particle size is within the range, an excellent binding force can be provided to the electrode, even when amount of use is small. Here, the number average particle size means number of pieces average particle size calculated as an arithmetic mean by measuring diameters of 100 binder particles selected randomly by a transmission electron microscopy photomicrograph. Shapes of the particles may be either spherical or heteromorphic. These binder can be used as alone or in combination of two kinds or more.

In the present invention, a content amount of the binder for conductive adhesive agent in the conductive adhesive layer is preferably 0.5 to 20 parts by weight, more preferably 1 to 15 parts by weight, particularly preferably 2 to 10 parts by weight to 100 parts by weight of the carbon particle.

The conductive adhesive layer used for the electrode for lithium ion capacitor of the present invention can be produced by coating and drying a conductive adhesive agent slurry composition on a collector, the conductive adhesive agent slurry composition is obtained by kneading the carbon particle and a preferably used conductive adhesive agent binder and a dispersion agent added if necessary in water or organic solvent.

As for specific examples of the dispersion agent, a cellulose type polymer and ammonium salts or alkali metal salts thereof such as carboxymethyl cellulose, methylcellulose, ethylcellulose and hydroxypropyl cellulose; poly(meth)acrylate such as sodium poly(meth)acrylate; polyvinyl alcohol, modified polyvinyl alcohol, polyethylene oxide; polyvinyl pyrolidone, polycarboxylic acid, starch oxide, starch phosphorus, casein, various modified starch, chitin, chitosan derivative and the like are exemplified. These dispersion agents can be used as alone or in combination of two kinds or more. Among them, the cellulose type polymer is preferable, the carboxyl cellulose or ammonium salts or alkali metal salts thereof are particularly preferable.

Amount of these dispersion agents can be within a range where effects of the present invention is not lost, although there is no particular limitation, normally within a range of 1 to 15 parts by weight, preferably 0.5 to 10 parts by weight, more preferably 0.8 to 5 parts by weight to 100 parts by weight of the carbon particle.

In the present invention, the conductive adhesive layer may be formed by applying and drying the obtained conductive adhesive agent slurry composition on the collector, and may be formed by applying and drying the obtained conductive adhesive slurry composition on an electrode composition layer. By forming the above mentioned conductive adhesive layer, a binding property between the electrode composition layer and the collector can be improved and it contributes for reducing the internal resistance.

A solid content concentration of the conductive adhesive agent slurry composition used for the present invention is, although it depends on coating method, normally 10 to 60%, preferably 15 to 50%, particularly preferably 20 to 40%. When the solid content concentration is within this range, the conductive adhesive layer is highly fulfilled so that an energy density and power density are increased.

Viscosity of the conductive adhesive agent slurry composition used for the present invention is, although it depends on applying methods, normally 50 to 10,000 mPa·s, preferably 100 to 5,000 mPa·s, particularly preferably 200 to 2,000 mPa·s. When the viscosity of the conductive adhesive agent slurry composition is within this range, a uniform conductive adhesive layer can be formed on the collector.

Methods for forming the conductive adhesive layer used for the electrode for the lithium ion capacitor of the present invention are not particularly limited. It is formed on the collector or the electrode composition layer by, for example, doctor blade method, dip method, reverse roll method, direct roll method, gravure method, extrusion method, brush coating and the like.

As for drying methods for the conductive adhesive layer, for example, drying by warm air, hot air, low humid air, vacuum drying, irradiating (far) infrared ray and electron beam and the like are exemplified. Among these, the drying method by hot air and the drying method by irradiating far infrared ray are preferable. With respect to drying temperature and drying time, it is preferable that temperature and time which are capable to completely remove solvent in the slurry which is applied on the collector or electrode composition layer, the drying temperature is normally 50 to 300° C., preferably 80 to 250° C. The drying time is normally 2 hrs or less, preferably 5 sec to 30 min.

A thickness of the conductive adhesive layer is normally 0.01 to 20 μm, preferably 0.1 to 10 μm, particularly preferably 1 to 5 μm. When the thickness of the conductive adhesive layer is within said range, excellent adhesive property can be obtained and electron transfer resistance can be reduced.

Kinds and particle size of the carbon particles in the conductive adhesive layer can be identified by performing image analysis of electrode cross section with using FE-SEM or FE-TEM.

The electrode composition layer used for the present invention is composed of an electrode active material, a conductive material and a binder.

(Electrode Active Material)

An electrode active material used for the electrode for lithium ion capacitor of the present invention is a delivering material of electron in the electrode for the lithium ion capacitor.

As for the electrode active material used for a positive electrode for lithium ion capacitor, any material that can reversely support lithium ion and anion such as, for example, tetrafluoroborate can be used. Specifically, allotrope of carbon is used normally, and an electrode active material used for an electrode double layer capacitor can be used widely. As for specific examples of the allotrope of carbon, activated carbon, polyacene (PAS), carbon whisker, graphite and the like are exemplified, and powder or fiber thereof may be used. Among these, the activated carbon is preferable. As for the activated carbon, specifically, examples include activated carbon wherein phenol resin, artificial silk, acrylonitrile resin, pitch, coconut shell and the like are used as raw materials. Also, in case of the allotrope of carbon is used as combination, two kinds or more allotrope of carbons having different average particle size or particle size distribution may be used. Also, as for the electrode active material used for the positive electrode, other than the above material, a polyacene type organic semi-conductor (PAS) having a polyacene type, skeleton structure wherein atomic ratio of hydrogen atom/carbon atom is 0.50 to 0.05 which is thermally treated aromatic condensed polymer may be preferably used.

As for an electrode active material used for a negative electrode for the electrode for lithium ion capacitor, any material that can reversely support lithium ion can be used. Specifically, electrode active materials used for the negative electrode of lithium ion secondary battery may be used widely. Among these, crystalline carbon materials such as graphite, difficult graphitizing carbon and the like, carbon materials such as hard carbon, coke and the like, polyacene type material (PAS) which is also mentioned as the electrode active material of the above positive electrode are preferable. These carbon materials and PAS are those obtained by carbonizing the phenol resin and the like, and activated if necessary and then pulverized.

A shape of the electrode active material used for the electrode for lithium ion capacitor is preferably granulated particulate. Further, in case that the shape of the particle is spherical, more high density electrode can be formed when forming the electrode.

A volume average particle size of the electrode active material used for the electrode for lithium ion capacitor is, both positive and negative electrodes, commonly 0.1 to 100 μm, preferably 0.5 to 50 μm, more preferably 1 to 20 μm. These electrode active materials may be used as alone respectively or in combination of two kinds or more.

(Conductive Material)

A conductive material used for the electrode for lithium ion capacitor of the present invention is composed of particulate allotrope of carbon having conductive property and not having fine pores which is capable to form an electrode double layer, specifically conductive carbon black such as furnace black, acetylene black and ketchen black (Registered Trademark of Akzo Nobel chemicals B.V.) and the like are exemplified. Among these, the acetylene black and furnace black are preferable.

A volume average particle size of the conductive material used for the electrode for lithium ion capacitor of the present invention is preferably smaller than the volume average particle size of the electrode active material, a range thereof is normally 0.001 to 10 μm, preferably 0.05 to 5 μm, more preferably 0.01 to 1 μm. When the volume average particle size of the conductive material is within this range, high conductive characteristic can be obtained by even when amount of use is small. These conductive materials can be used as alone or in combination of two kinds or more. An amount of the conductive material in the electrode composition layer is normally 0.1 to 50 parts by weight, preferably 0.5 to 15 parts by weight, more preferably 1 to 10 parts by weight to 100 parts by weight of the electrode active material. When the amount of the conductive material is within this range, a capacity of the lithium ion capacitor, wherein the obtained electrode for lithium ion capacitor is used, can be higher and the internal resistance can be reduced.

(Binder)

There is no particular limitation for a binder used for the electrode composition layer of the electrode for lithium ion capacitor of the present invention, if the binder is compound which is capable to bind the electrode active material and the conductive material. A preferable binder is dispersed type binder having dispersion property to solvent. As for the dispersed type binder, polymer compound, such as, fluoropolymer, diene polymer, acrylate polymer, polyimide, polyamide, polyurethane polymer and the like are exemplified, the fluoropolymer, the diene polymer or acrylate polymer are preferable, the diene polymer or the acrylate polymer are further preferable, because an electric resistance can be increased and an energy density of the lithium ion capacitor can be increased.

The diene polymer is a homopolymer of a conjugated diene or a copolymer obtained by polymerizing monomer mixture including conjugated diene or hydrogen additives thereof. A ratio of the conjugated diene in said monomer mixture is normally 40 wt % or more, preferably 50 wt % or more, more preferably 60 wt % or more. As for specific examples of the diene polymer are conjugated diene homopolymer such as polybutadiene, polyisoprene and the like; aromatic vinyl/conjugated diene copolymer (SBR) and the like which may be carboxy modified; vinyl cyanide/conjugated diene copolymer such as acrylonitrile/butadiene copolymer (NBR); hydrogenated SBR, hydrogenated NBR and the like are exemplified.

The acrylate polymer is a polymer obtained by polymerizing monomer mixture comprising a compound shown by a general formula (2): $CH_2=CR^1-COOR^2$ (in the formula, $R^1$ shows hydrogen atom or methyl group, $R^2$ shows alkyl group or cycloalkyl group). As for specific examples of the compound shown by the general formula (2), acrylate such as ethyl acrylate, propyl acrylate, isopropyl acrylate, n-butyl acrylate, isobutyl acrylate, t-butyl acrylate, n-amyl acrylate, isoamyl acrylate, n-hexyl acrylate, 2-ethylhexyl acrylate, hexyl acrylate, nonyl acrylate, lauryl acrylate, stearyl acrylate and the like; methacrylate such as ethyl methacrylate, propyl methacrylate, isopropyl methacrylate, n-butyl methacrylate, isobutyl methacrylate, t-butyl methacrylate, n-amyl methacrylate, isoamyl methacrylate, n-hexyl methacrylate, 2-ethylhexyl methacrylate, octyl methacrylate, isodecyl methacrylate, lauryl methacrylate, tridecyl methacrylate, stearyl methacrylate and the like are exemplified. Among these, the acrylate is preferable, the n-butyl acrylate and 2-ethylhexyl acrylate are particularly preferable in view of an electrode strength of the obtained electrode can be improved. A ratio of monomer unit derived from the acrylate and/or methacrylate in the acrylate polymer is normally 50 wt % or more, preferably 70 wt % or more. When the acrylate polymer, wherein the ratio of the monomer unit derived from said acrylate and/or methacrylate is within said range is used, heat resistance is high and the internal resistance of the obtained electrode for lithium ion capacitor can be reduced.

For said acrylate polymer, a polymerizable monomer comprising carboxylic acid group can be used, in addition to the compounds shown by general formula (2), as for specific examples, monomer comprising monobasic acid such as acrylic acid, methacrylic acid and the like; monomer comprising dibasic acid such as maleic acid, fumaric acid, itaconic acid and the like can be exemplified. Among these, the monomer comprising dibasic acid is preferable and the itaconic acid is particularly preferable at a point that binding property to the conductive adhesive layer is increased, so that the electrode strength can be improved. These monomer comprising monobasic acid and monomer comprising dibasic acid can be used as alone respectively or in combination of two kinds or more. An amount of the monomer containing carboxylic acid in said monomer mixture when copolymerizing is normally 0.1 to 50 parts by weight, preferably 0.5 to 20 parts by weight, more preferably 1 to 10 parts by weight to 100 parts by weight of compound shown by the general formula (2). When the amount of the monomer containing carboxylic acid is within this range, binding property with the conductive adhesive layer is excellent and the obtained electrode strength is increased.

The acrylate polymer may contain monomer unit derived from a polymerizable monomer comprising nitrile group in addition to compound shown by the general formula (2). As for specific examples of the monomer containing nitrile group, acrylonitrile, methacrylonitrile and the like are exemplified, among them, the acrylonitrile is preferable because binding property with the conductive adhesive layer is increased so that the electrode strength can be improved. An amount of the acrylonitrile in said monomer mixture when copolymerizing is normally 0.1 to 40 parts by weight, preferably 0.5 to 30 parts by weight, more preferably 1 to 20 parts by weight to 100 parts by weight of the compound shown by the general formula (2). When the amount of the acrylonitrile is within this range, binding property with the conductive adhesive layer is excellent and the obtained electrode strength is increased.

Although there is no limitation for a shape of the binder used for the electrode composition layer of the electrode for lithium ion capacitor of the present invention, particulate is preferable because binding property with the conductive adhesive layer is excellent and it is possible to prevent capacity decreasing and deterioration by repeating charge and discharge of the produced electrode. As for the particulate binder, for example, particles of the binder dispersed in water such as latex and powder obtained by drying the dispersion are exemplified.

A glass transition temperature (Tg) of the binder used for the electrode composition layer of the electrode for lithium ion capacitor of the present invention is preferably 50° C. or below, further preferably −40 to 0° C. When the glass transition temperature of the binder is within this range, the binding property is excellent, the electrode strength is strong, flexibility is excellent by small amount of use, so that electrode density can be improved easily by pressing process at the time of producing electrode.

When the binder used for the electrode composition layer of the electrode for lithium ion capacitor of the present invention is particulate, although there is no particular limitation for a number average particle size thereof, the number average particle size of the binder is normally 0.0001 to 100 μm, preferably 0.001 to 10 μm, more preferably 0.01 to 1 μm. When the number average particle size of the binder is within this range, an excellent binding force can be provided to the electrode, even when amount of use is small. Here, the number average particle size means number of pieces average particle size calculated as an arithmetic mean by measuring diameters of 100 binder particles selected randomly by a transmission electron microscopy photomicrograph. Shapes of the particles may be either spherical or heteromorphic. These binder can be used as alone or in combination of two kinds or more.

Amount of the binder for electrode composition in the electrode composition layer is normally 0.1 to 50 parts by weight, preferably 0.5 to 20 parts by weight, further preferably 1 to 10 parts by weight to 100 parts by weight of the electrode active material. When the binder for electrode composition is within this range, an adhesive property of the electrode composition layer and the conductive adhesive layer can be maintained properly, a capacity of the lithium ion capacitor can be improved and the internal resistance can be reduced.

(Electrode Composition Layer)

Although an electrode composition layer of the electrode for lithium ion capacitor of the present invention is provided on a conductive adhesive layer, a forming method is not limited. Specifically, 1) a method that a composition for forming electrode composed by kneading electrode active material, conductive material and binder so as to form as a sheet, the obtained sheet shaped composition for forming electrode is laminated on a collector to which a conductive adhesive layer is formed (kneading sheet forming method), 2) a method that preparing a paste form composition for forming an electrode which is composed of electrode active material, conductive material and binder, applying it on a collector to which a conductive adhesive layer is formed and drying (wet forming method), 3) a method that preparing composite particle composed of electrode active material, conductive material and binder, sheet forming on a collector to which a conductive adhesive layer is formed, then roll pressed (dry forming method) and the like are exemplified. Among these, 2) wet forming method and 3) dry forming method are preferable, 3) dry forming method is further preferable, in view of that a capacity of an obtainable lithium ion capacitor can be increased and internal resistance can be reduced.

The composition for forming electrode comprise the electrode active material, the conductive material and the binder as indispensable compounds, and other dispersion agent and additives may be added, if necessary, as. As for specific examples of the other dispersion agent, cellulose type polymer such as carboxymethyl cellulose, methyl cellulose, ethyl cellulose and hydroxypropyl cellulose and the like, and ammonium salts or alkali metal salts thereof; poly(meth)acrylate such as sodium poly(meth)acrylate; polyvinyl alcohol, modified polyvinyl alcohol, polyethylene oxide; polyvinyl pyrolidone, polycarboxylate, starch oxide, starch phosphorus, casein, various modified starch, chitin, chitosan derivative and the like are exemplified. These dispersion agents can be used as alone or in combination of two kinds or more. Among them, the cellulose type polymer is preferable, the carboxymethyl cellulose or ammonium salts or alkali metal salts thereof are particularly preferable. Amount of these dispersion agents can be within a range of not losing effect of the present invention, and although there is no particular limitation, it is normally within a range of 0.1 to 10 parts by weight, preferably 0.5 to 5 parts by weight, more preferably 0.8 to 2 parts by weight to 100 parts by weight of the electrode active material.

When the electrode composition layer of the present invention is formed by said 2) wet forming method, the paste form composition for forming electrode (herein after sometimes referred as "slurry for forming electrode composition layer") may be produced by kneading the electrode active material, the conductive material and the binder which are indispensable components, and other dispersion agents and additives in water or an organic solvent such as, N-methyl-2-pirolydone, tetrahydrofuran and the like. As for the slurry for forming electrode composition layer, aqueous slurry, wherein water is dispersion medium, is preferable in view of easiness of drying of the electrode composition layer and having excellent characteristic for environment load.

As for a method for producing aqueous slurry, the sully can be produced by kneading water and said respective components with using a blender. As for the blender, a ball mill, a sand mill, a pigment dispersing machine, a kneader, a supersonic dispersing machine, a homogenizer, a planetary mixer, a Hobart mixer and the like can be used. Also, it is preferable method that the electrode active material and the conductive material were blended firstly by the blender such as kneader planetary mixer, a Henschel mixer and an OMNI mixer and the like, then the binder and the other dispersion agent and additives were added for homogeneity blending. By applying this method, homogeneous slurry can be obtained easily.

Viscosity of the slurry for electrode composition layer used for the present invention is although depends on a kind of coating machine and a shape of coating line, normally 100 to 100,000 mPa·s, preferably 1,000 to 50,000 mPa·s, particularly preferably 5,000 to 20,000 mPa·s.

A coating method for the slurry on the collector is not particularly limited. For example, doctor blade method, dip method, reverse roll method, direct roll method, gravure method, extrusion method, brush coating and the like are exemplified. A coating thickness of the slurry is suitably set in response to a thickness of an objected electrode composition layer.

As for the drying method, for example, drying by warm air, hot air, low humid air, vacuum drying, drying methods by irradiating (far) infrared radiation, electron beam and the like are exemplified. Among them, the drying method by irradiating far infrared ray is preferable. With respect to drying temperature and drying time of the present invention, it is preferable that temperature and time which are capable to remove solvent completely in the slurry which is coated on the collector, the drying temperature is normally 100 to 300° C., preferably 120 to 250° C. As for the drying time, it is normally 10 min to 100 hrs, preferably 20 min to 20 hrs.

When the electrode composition layer of the present invention is formed by said 3) dry forming method, the used composite particle means a particulate wherein the electrode active material, the conductive material, the binder, the other dispersion agent and additives are integrated.

A method for producing the composite particle is not particularly limited, it can be produced by, for example, a spray dry granulating method, a tumbling layer granulating method, a compression type granulating method, a stirred type granulating method, an extrusion granulating method, a grinder type granulating method, a fluidized layer granulating method, a fluidized layer multi function type granulating method, a pulse combustion type drying method, a melt granulating method and the like. Among them, the spray dry granulating method is preferable, in view of that composite particle wherein the binding agent and the conductive agent are localized at near surface can be obtained easily. When the composite particle obtained by the spray dry granulating method is used, it is possible to obtain an electrode for electric chemical element of the present invention at high productivity rate. Also, an internal resistance of said electrode can be reduced further.

In said spray dry granulating method, firstly the above mentioned electrode active material, the conductive material, the binder and other components are dispersed or dissolved in a solution so as to obtain a slurry wherein the electrode active material, the conductive material, the binder, other components and additive agent are dispersed or dissolved.

Although a solvent used for obtaining the slurry is not particularly limited, in case that the above mentioned dispersion agent is used, a solvent to which the dispersion agent can be dissolved is used. Specifically, although water is used normally, an organic solvent can be used too, and mixture solvent of water and the organic solvent may be used. As for the organic solvent, for example, alkyl alcohols such as methyl alcohol, ethyl alcohol, propyl alcohol and the like; alkyl ketones such as acetone, methylethyl ketone and the like; ethers such as tetrahydrofuran, dioxan, diglyme and the like; amides such as diethylformamide, dimethylacetamide, N-methyl-2-pyloridone, dimethyl imidazolidinone and the like; sulfur type solvent such as dimethylsulfoxide, sulfolane and the like; etc. are exemplified. Among them, as for the organic solvent, the alcohols are preferable. When water and an organic solvent having lower boiling point than water are used in combination, the drying speed can be faster at the time of spray drying. Also, depends on amount or kind of the organic solvent used with water, a dispersing property of the binder or solubility of the dispersion agent will be changed. Thereby, the viscosity coefficient and flow property can be adjusted so that the productivity rate can be improved.

Amount of the solvent when preparing the slurry is that solid content concentration of the slurry becomes normally within a range of 1 to 50 wt %, preferably 5 to 50 wt %, more preferably 10 to 30 wt %. When the solid content concentration is within this range, it is preferable because the binding agent is dispersed homogeneity.

A method or sequence for dispersing or dissolving the electrode active material, the conductive material, the binder, the other dispersion agent and the additives into the solvent are not particularly limited, for example, a method for blending the electrode active material, the conductive material, the binder, the other dispersion agent and the additives are added into the solvent; a method for blending that after dissolving the dispersion agent to the solvent, the binder dispersed in the solvent is added for blending, finally the electrode active material and the conductive material are added; a method that the electrode active material and the conductive material are added to the binder dispersed into the solvent and blended, the dispersion agent dissolved in the solvent is added to the mixture are exemplified. As means for blending, for example, blending machines such as a ball mill, a sand mill, a bead mill, a pigment dispersing machine, a kneader, a super-sonic dispersing machine, a homogenizer, a homomixer, a planetary mixer and the like are exemplified. The blending is normally performed within a range from a room temperature to 80° C. for 10 min to several hours.

Viscosity of the slurry is normally within a range of 10 to 3,000 mPa·s, preferably 30 to 1,500 mPa·s, further preferably 50 to 1,000 mPa·s. When the viscosity is within this range, the productive rate of the composite particle can be improved. Also, when the viscosity is higher, a spray drop becomes larger and a weight average particle size of the obtainable composite particle becomes larger.

Next, the above mentioned obtained slurry is granulated by spray drying so as to obtain the composite particle. The spray drying is performed by spraying the slurry in hot air for drying. As for an apparatus for spraying the slurry, an atomizer is exemplified. There are two kinds of the atomizer such as a rotary disk type and a pressurizing type. The rotary disk type is that the slurry is introduced into almost center of a disk which rotates at high speed, the slurry is released to outside of the disk by a centrifugal force of the disk, at this time the slurry is atomized. Although a rotating speed of the disk depends on a size of the disk, normally 5,000 to 30,000 rpm, preferably 15,000 to 30,000 rpm. When the rotating speed is lower, the spray drop becomes larger, and the volume average particle size of the obtainable composite particle becomes larger. As for the rotating disk type atomizer, although a pin type and a vane type atomizer are exemplified, the pin type atomizer is preferred. The pin type atomizer is one of a centrifugal type atomizer which uses a spray disc, said spray disc is composed of a plurality of rollers for spraying detachably mounted on almost concentric circle along a circumference between an upper and lower mounting discs. The slurry is introduced from a center of the spraying disc and adheres to the spraying rollers by a centrifugal force and moved toward an outside on a roller surface, and finally removed from the roller surface so as to be sprayed. On the other hand, the pressurizing type is a drying method to spraying the slurry from a nozzle by pressure.

Although a temperature of the sprayed slurry is normally a room temperature, it may be higher than the room temperature by heating. Also, a hot air temperature when spray drying is normally 80 to 250° C., preferably 100 to 200° C. In the spray drying, a method for blowing the hot air is not particularly limited, for example, a co-current flow method wherein the hot air and spraying direction are co-current to a lateral direction, a method that sprayed at a drying overhead portion and descends with the hot air, a method that the sprayed drop and the hot air are counter concurrent contacting, a method that the sprayed drop concurrent flows with the hot air firstly, then counter concurrent contacts by gravity falling and the like are exemplified.

Also, said composite particle is preferably spherical. Evaluation as to whether said composite particle is spherical or not is performed by a value calculated by $(Ll-Ls)/\{(Ls+Ll)/2\} \times 100$ (hereinafter referred as "spherical degree") or by a value calculated by defining $La=(Ls+Ll)/2$ and $(1-(Ll-LS)/La) \times 100$ (hereinafter referred as "sphericity"), when a short axis diameter of the composite particle is $Ls$ and a long axis diameter is $Ll$. Here, the short axis diameter $Ls$ and the long axis diameter $Ll$ are average values with respect to arbitral 100 composite particles measured by a photographic image by observing the composite particle with using a reflection electron microscope. When a numerical value of the spherical degree is smaller, or a numerical value of the sphericity is larger, it is shown that the composite particle close to sphere.

For example, with respect to particles observed as a quadrate in the above mentioned photographic image, the above mentioned spherical degree is calculated as 34.4%, the composite particle which shows the spherical degree exceeds 34.4% cannot be said as sphere at least. The spherical degree of the composite particle is preferably 20% or less, more preferably 15% or less. On the other hand, the sphericity of the composite particle is preferably 80% or more, more preferably 90% or more.

For the composite particle obtained by the above mentioned producing method, after treatment may be applied after granulating if necessary. As for specific examples, according to blending the above mentioned electrode active material, the conductive material, the binder for electrode composition or dispersion agent and the like to the composite particle so as to reform the surface of particle, flow property of the composite particle can be improved or reduced, continuous pressuring forming property can be improved, electric conductivity of the composite particle and the like can be improved.

A weight average particle size of the composite particle preferably used for the present invention is normally within a range of 0.1 to 1000 μm, preferably 5 to 500 μm, more preferably 10 to 100 μm. When the weight average particle size is within the range, it is preferable because the composite particle is hard to aggregate and an electrostatic force to gravity becomes larger. The weight average particle size can be measured by using a laser diffraction particle size distribution measuring apparatus.

In the present invention, although a feeder used in a process for supplying the composite particle is not particularly limited, it is preferable a quantitative feeder which is capable to supply the composite particle quantitatively. Here, the capable to supply quantitatively means that the composite particle is supplied continuously by using the feeder, measuring the supplying amount at plurality of times by regular intervals, CV value (=σm/m×100), which is calculated from an average value "m" thereof and a standard deviation "σm", is 4 or less. The quantitative feeder preferably used for the present invention has 2 or less CV value. As for specific examples of the quantitative feeder, a gravity feeder such as a table feeder, a rotary feeder and the like, a mechanical force feeder such as a screw feeder, a belt feeder and the like are exemplified. Among them, the rotary feeder is preferable.

Next, the collector wherein the conductive adhesive layer is formed and the supplied composite particle are pressed by a pair of rolls to form an electrode composition layer on the conductive adhesive layer. In this process, said composite particle to be heated if necessary is formed as a sheet shaped electrode composition layer by the pair of rolls. A temperature of the supplied composite particle is preferably 40 to 160° C., more preferably 70 to 140° C. When the composite particle within this temperature range is used, the electrode composition layer having uniform film thickness and small variations of electrode density can be obtained, because there is no skidding of the composite particle on a surface of a roll for pressing and the composite particle can be supplied uniformly and continuously.

When forming, a temperature is normally 0 to 200° C., it is preferable that the temperature is higher than a melting point of the glass transition temperature of the binder for electrode composition and further preferably higher than 20° C. or more from the melting point or the glass transition temperature. When using a roll, a forming speed is normally faster than 0.1 m/min, preferably 35 to 70 m/min. Also, a press line pressure between rolls for pressing is normally 0.2 to 30 kN/cm, preferably 0.5 to 10 kN/cm.

In the above mentioned producing method, although arrangement of said pair of roll is not particularly limited, it is preferable to be arranged about horizontally or about vertically. In case of arranging about horizontally, according to said collector is supplied continuously between the pair of rolls, and the composite particle is supplied to at least one of said roll, the composite particle is supplied to a space between the roller and the collector to which the conductive adhesive layer is formed so that the electrode composition layer can be formed by pressing. In case of arranging about vertically, the collector, to which said conductive adhesive layer is formed, is transferred to horizontal direction, the composite particle is supplied on said collector, then smoothing the supplied composite particle by a blade and the like if necessary, the collector to which said conductive adhesive layer is formed is supplied to a space between the pair of rolls so that the electrode composition layer is formed by pressing.

In order to eliminate thickness variation of the formed electrode composition layer and aim to high capacitance by rising density, post-pressing may be performed further if necessary. A method for the post-pressing is normally press processing by a roll. In the roll pressing process, two cylindrical rolls are arranged as above and below in parallel with a narrow space to rotate reverse direction respectively so that the electrode is inserted to therebetween and pressed. The temperature of rolls may be adjusted such as heating or cooling and the like.

Although the density of the electrode composition layer for the electrode for lithium ion capacitor of the present invention is not particularly limited, normally 0.30 to 10 g/cm$^3$, preferably 0.35 to 5.0 g/cm$^3$, more preferably 0.40 to 3.0 g/cm$^3$. Also, although a thickness of the electrode composition layer is not particularly limited, normally 5 to 1000 μm, preferably 20 to 500 μm, more preferably 30 to 300 μm.

(Lithium Ion Capacitor)

A lithium ion capacitor of the present invention comprises a positive electrode, a negative electrode, electrolyte solution and a separator characterized by that said positive electrode or negative electrode is said electrode. In the lithium ion capacitor of the present invention, it is preferable that the positive electrode and negative electrode are said electrode for lithium ion capacitor. Durability of the lithium ion capacitor can be improved further when the positive and negative electrodes are said electrode for lithium ion capacitor.

The separator is not particularly limited, if it is possible to insulate a space between the electrodes for lithium ion capacitor, and if cation and anion can pass through the separator. Specifically, polyolefin such as polyethylene, polypropylene and the like, microporous membrane or nonwoven fabrics made of rayon, glass textile and the like, a porous film wherein a pulp is used as a main raw material which is generally called as an electrolyte capacitor paper may be used. The separator is arranged at a space between the electrodes for lithium ion capacitor as the above mentioned pair of electrodes are facing so that elements are obtained. Although a thickness of the separator is suitably selected in response to a purpose of use, normally 1 to 100 μm, preferably 10 to 80 μm, more preferably 20 to 60 μm.

Electrolyte solution is normally composed of electrolyte and solvent. With respect to the electrolyte, as for cation, lithium ion can be used. As for anion, $PF_6^-$, $BF_4^-$, $AsF_6^-$, $SbF_6^-$, $N(RfSO_3)^{2-}$, $C(RfSO_3)^{3-}$, $RfSO_3^-$ (Rf shows fluoroalkyl group of 1-12 carbon atoms, respectively), F—, $ClO_4^-$, $AlCl_4^-$, $AlF_4^-$ and the like can be used. These electrolyte solution can be used as alone or in combination of two kinds or more.

The solvent of the electrolyte solution is not particularly limited, if it is used as solvent of the electrolyte solution in general. Specifically, carbonates such as propylene carbonate, ethylene carbonate, butylene carbonate and the like; lactones such as γ-butyrolactone and the like; sulfolanes; nitriles such as acetonitrile and the like are exemplified. These solvents can be used as alone or in combination of two kinds or more. Among them, the carbonate is preferable.

The electrolyte solution is impregnated to the above mentioned elements so that a lithium ion capacitor can be obtained. Specifically, it can be produced by that the elements are inserted into a container by winding, laminating, folding and the like if necessary, pouring the electrolyte solution into the container and sealed. Also, the electrolyte solution is pre-impregnated to the element, and it may be stored into the container. As for the container, any conventionally known matters can be used such as a coin type, a cylindrical type, square type and the like.

EXAMPLES

Below, although the present invention will be specified further precisely by examples and a comparative example, the present invention is not limited to these examples. Note that, parts and % in the examples and comparative examples are a weight basis unless otherwise particularly indicated. Each characteristic in the examples and comparative example are measured in accordance with following methods.

(Battery Characteristic and Durability of Lithium Ion Capacitor)

A lithium ion capacitor of multilayer type laminate cell is produced by using an electrode for lithium ion capacitor produced in examples and comparative example. As for a battery property of the lithium ion capacitor, with respect to a capacity and an internal resistance, these are measured by performing charge and discharge operations after standing 24 hrs. Here, the charge is started by a static current of 2 A, when the voltage is reached to 3.6V, the voltage is kept during 1 hr as a constant voltage charging. Also, the discharge is performed until it reached to 1.9V by the constant current 0.9 A immediately after finish the charging.

A capacity is calculated as a capacity from an amount of discharged energy per unit weight of electrode active material.

An internal resistance is calculated from voltage drop of immediately after discharging. When the internal resistance is lower, an output density is high.

Also, durability is evaluated by calculating a capacity maintaining ratio after applying 3.6V to a lithium ion capacitor continuously 1000 hrs in 70° C. of a thermostatic bath, and following criteria. When the capacity maintaining ratio is larger, durability is excellent.

A: Capacity maintaining ratio is 90% or more
B: Capacity maintaining ratio is 80% or more and less than 90%
C: Capacity maintaining ratio is less than 80%

(Peel Strength of Electrode)

The electrode for lithium ion capacitor was cutout as a rectangular shape in which a long side is 100 mm, a short side is 10 mm for a test piece so that a coating direction of the electrode composition layer becomes the long side, a cellophane tape (defined by JIS Z1522) is applied to a surface of the electrode composition layer to cause an electrode composition layer face is down side, a stress force is measured when one end of the collector is peeled by pulling to a vertical direction with a pulling speed 50 mm/min (Note that the cellophane-tape is fixed to a test stand). This measuring is performed three times so that an average value thereof is calculated to define the peel strength and evaluated by following criteria. When the peel strength is larger, a binding strength to the collector of the electrode composition layer is larger, namely the electrode strength is larger.

A: Peel strength is 20N/m or more
B: Peel strength is 10N/m or more and less than 20 N/m
C: Pees strength is less than 10 N/m

Example 1

100 parts of graphite (KS-6; made by TIMCAL, below sometimes referred as "carbon particle B1") having 3.7 µm of volume average particle size, 0.004 Ω·cm of electric resistance rate as carbon particles, 4 parts in terms of solid content, of 4.0% of aqueous solution of carboxymethyl cellulose (DN-10L: made by DAICEL CHEMICAL INDUSTRIES, LTD) as a dispersion agent, 8 parts in terms of solid content, of 40% aqueous dispersion of diene polymer having glass transition temperature of –48° C. and a number average particle size of 0.25 µm as a binder for conductive adhesive agent and ion exchanged water were blended so that a total solid content concentration becomes 30%, a slurry composition for forming a conductive adhesive layer was prepared.

A conductive adhesive layer was formed by that a pair of die is provided at a downstream side of a running direction of a collector so as to sandwich an expanded aluminum collector (ratio of through holes penetrating one side surface to other side surface: 40 area %) having 30 µm of thickness which runs vertically (running direction of the collector is from down to up), the slurry composition for forming said conductive adhesive layer was discharged from the pair of die and coated to the both faces of the collector by 30 m/min of forming speed, drying for 5 min at 120° C.

On the other hand, 100 parts of activated carbon powder (MSP-20; made by KANSAI COKE AND CHEMICALS CO., LTD.) having volume average particle size of 8 µm which is alkali activated carbon wherein phenol resin is a raw material as an electrode active material of a positive electrode, 2.0 parts, in terms of solid content, of 1.5% aqueous solution of carboxymethyl cellulose ammonium (DN-800H; made by DAICEL CHEMICAL INDUSTRIES, LTD) as a dispersion agent, 5 parts of acetylene black (DENKA BLACK powder shape; made of DENKI KAGAKU KOGYO KABUSHIKI KAISHA) as a conductive material, 3.0 parts, in terms of solid content, of 40% aqueous dispersion of diene polymer having a glass transition temperature of –48° C. and number average particle size of 0.25 µm as a binder for electrode composition and ion exchanged water were blended by a planetary mixer so that a total solid content concentration becomes 35%, an electrode composition for a positive electrode was prepared.

An electrode for lithium ion capacitor of a positive electrode having 100 µm thickness of one side face of electrode composition layer was obtained by that a pair of die is provided at a downstream side of a running direction of a collector so as to sandwich the expanded aluminum collector (ratio of through holes penetrating one side surface to other side surface: 40 area %) having conductive adhesive layer provided as above which runs vertically (running direction of the collector is from down to up), said composition for positive electrode was discharged from the pair of die and coating to the both faces of the collector by 30 m/min of forming speed, after drying for 5 min at 120° C. and punched out as 5 cm square.

A conductive adhesive layer was formed by that a pair of die is provided at a downstream side of a running direction of a collector so as to sandwich an expanded copper collector (ratio of through holes penetrating one side surface to other side surface: 40 area %) having 20 µm of thickness which runs vertically (running direction of the collector is from down to up), the slurry composition for forming said conductive adhesive layer was discharged from the pair of die and coating to the both faces of the collector by 30 m/min of forming speed, drying for 5 min at 120° C.

On the other hand, 100 parts of graphite (KS-6; made by TIMCAL LTD.) having 3.7 µm volume average particle size as an active material of a negative electrode, 2.0 parts, in terms of solid content, of 1.5% aqueous solution (DN-800H; made of DAICEL CHEMICAL INDUSTRIES, LTD) of carboxymethyl cellulose ammonium as a dispersion agent, 5 parts of acetylene black (DENKA BLACK powder shape; made of DENKI KAGAKU KOGYO KABUSHIKI KAISHA) as a conductive material, 3.0 parts, in terms of solid content, of 40% aqueous dispersion of diene polymer having a glass transition temperature of −48° C. and a number average particle size of 0.25 μm as a binder for electrode composition and ion exchanged water were blended so that a total solid content concentration becomes 35%, an electrode composition for a negative electrode was prepared.

An electrode for lithium ion capacitor of a negative electrode having 100 μm thickness of one side face of electrode composition layer was obtained by that a pair of die is provided at a downstream side of a running direction of a collector so as to sandwich the expanded copper collector (ratio of through holes penetrating one side surface to other side surface: 40 area %) having conductive adhesive layer provided as above which runs vertically (running direction of the collector is from down to up), said composition for negative electrode was discharged from the pair of die and coating to the both faces of the collector by 20 m/min of forming speed, after drying for 5 min at 120° C., punched as 5 cm square.

As for the electrode for lithium ion capacitor of said positive electrode, negative electrode and cellulose/rayon unwoven fabric as separator was impregnated into electrolyte solution for 1 hr at room temperature. Next, a multilayer type laminate cell shape lithium ion capacitor was produced by arranging 10 pieces of the positive electrode and 10 pieces of the negative electrode so that the positive electrode for lithium ion capacitor and the negative electrode for lithium ion capacitor are facing via the separator, and the respective electrodes for lithium ion capacitor do not contact electrically. The electrolyte solution was obtained by blending ethylene carbonate, diethyl carbonate and propylene carbonate at 3:4:1 by weight ratio, and dissolving $LiPF_6$ into the above mixture medium so that as concentration becomes 1.0 mol/litter.

As for a lithium electrode for the multilayer type laminate cell, a lithium metal foil (82 μm thickness, 5 cm×5 cm) which is pressure bonded with a stainless mesh having 80 μm thickness was used, and each one sheet of said lithium electrode was arranged on upper and lower portion of electrode which is laminated with the most outer portion of the negative electrode as facing completely. Note that, terminal welded parts (2 sheets) of a lithium electrode collector were resistance welded to a negative electrode terminal welded part. A measuring result with respect to each characteristic of the lithium ion capacitor was shown in Table 1.

Example 2

Except for using carbon black having 0.3 μm volume average particle size, 0.07 Ω·cm electric resistance rate (acetylene black; made by DENKI KAGAKU KOGYO KABUSHIKI KAISHA, herein after sometimes referred as "carbon particle A1"), instead of the carbon particle B1 in Example 1, an electrode for lithium ion capacitor and lithium ion capacitor were produced as similar with Example 1. A measuring result with respect to each characteristic of the lithium ion capacitor was shown in Table 1.

Example 3

Except for using carbon black having 0.3 μm volume average particle size, 0.06 Ω·cm electric resistance rate (Super-P; made by TIMCAL, below sometimes referred as "carbon particle A2"), instead of the carbon particle B1 in Example 1, an electrode for lithium ion capacitor and lithium ion capacitor were produced as similar with Example 1. A measuring result with respect to each characteristic of the lithium ion capacitor was shown in Table 1.

Example 4

Except for using carbon black having 0.3 μm volume average particle size, 0.02 Ω·cm electric resistance rate (BMAB; made by DENKI KAGAKU KOGYO KABUSHIKI KAISHA, herein after sometimes referred as "carbon particle A3"), instead of the carbon particle B1 in Example 1, an electrode for lithium ion capacitor and lithium ion capacitor were produced as similar with Example 1. A measuring result with respect to each characteristic of the lithium ion capacitor was shown in Table 1.

Example 5

As for carbon particle, except for using 10 parts of the carbon particle A3 as carbon particle (A), 90 parts of the carbon particle B1 as carbon particle (B) (weight ratio of carbon particle (A)/carbon particle (B)=0.11), an electrode for lithium ion capacitor and lithium ion capacitor were produced as similar with Example 1. A measuring result with respect to each characteristic of the lithium ion capacitor was shown in Table 1.

Example 6

As for carbon particle, except for using 20 parts of the carbon particle A3 as carbon particle (A), 80 parts of the carbon particle B1 as carbon particle (B) (weight ratio of carbon particle (A)/carbon particle (B)=0.25), an electrode for lithium ion capacitor and lithium ion capacitor were produced as similar with Example 1. A measuring result with respect to each characteristic of the lithium ion capacitor was shown in Table 1.

Example 7

As for carbon particle, except for using 50 parts of the carbon particle A3 as carbon particle (A), 50 parts of the carbon particle B1 as carbon particle (B) (weight ratio of carbon particle (A)/carbon particle (B)=1), an electrode for lithium ion capacitor and lithium ion capacitor were produced as similar with Example 1. A measuring result with respect to each characteristic of the lithium ion capacitor was shown in Table 1.

Example 8

As for the conductive adhesive binder used for conductive adhesive slurry composition, except for using 8 parts, in terms of solid content, of 40% water solution of acrylate polymer having glass transition temperature of −20° C., a number average particle size of 0.25 μm (copolymer obtained by emulsion polymerization from 76 wt % of 2-ethylhexyl acrylate, 20 wt % of acrylonitrile, and 4 wt % of itaconic acid) instead of diene polymer as in Example 6, an electrode for lithium ion capacitor and lithium ion capacitor were produced as similar with Example 6. A measuring result with respect to each characteristic of the lithium ion capacitor was shown in Table 1.

Example 9

Slurry composition for forming conductive adhesive layer was prepared by blending 20 parts of said carbon particle A3, 80 parts of carbon particle B1 (weight ratio of carbon particle (A3)/carbon particle (B)=0.25) as carbon particle, 4 parts, in terms of solid content, of 4.0% aqueous solution of carboxymethyl cellulose (DN-10L: made by DAICEL CHEMICAL INDUSTRIES, LTD) as a dispersion agent, 8 parts, in terms of solid content, of 40% water aqueous of acrylate polymer having glass transition temperature of −20° C. and a number average particle size of 0.25 μm (copolymer obtained by emulsion polymerization from 76 wt % of 2-ethylhexyl acrylate, 20 wt % of acrylonitrile, and 4 wt % of itaconic acid) as a binder for conductive adhesive agent and ion exchanged water were blended so that a total solid content concentration becomes 30%, a slurry composition for forming a conductive adhesive layer was prepared.

A conductive adhesive layer was formed by that a pair of die is provided at a downstream side of a running direction of a collector so as to sandwich an expanded aluminum collector (ratio of through holes penetrating one side surface to other side surface: 40 area %) having 30 μm of thickness which runs vertically (running direction of the collector is from down to up), the slurry composition for forming said conductive adhesive layer was discharged from the pair of die and coated to the both faces of the collector by 30 m/min of forming speed, drying for 5 min at 120° C.

100 parts of activated carbon powder (MSP-20; made by KANSAI COKE AND CHEMICALS CO., LTD.) having volume average particle size of 8 μm which is alkaline activation activated carbon wherein phenol resin is raw material as an electrode active material of a positive electrode, 2.0 parts, in terms of solid content, of 1.5% aqueous solution of carboxymethyl cellulose (DN-800H; made by DAICEL CHEMICAL INDUSTRIES, LTD) as a dispersion agent, 5 parts of acetylene black (DENKA BLACK powder shape; made of DENKI KAGAKU KOGYO KABUSHIKI KAISHA) as a conductive material, 3.0 parts, in terms of solid content, of 40% aqueous dispersion of acrylate polymer (copolymer obtained by emulsion polymerizing of 70 parts of 2-ethylhexyl acrylate, 15 parts of acrylonitrile, and 15 parts of itaconic acid) having glass transition temperature of −12° C. and number average particle size of 0.25 μm as a binder for electrode composition and ion exchanged water were blended so that a total solid content concentration becomes 35%, an electrode composition for a positive electrode was prepared.

Next, spray dry granulating is performed to this slurry under a condition that a rotation speed 25,000 rpm of a rotation disk type atomizer (65 mm diameter), 150° C. of hot air temperature, 90° C. of a particle recovery port temperature, by using a spray drying machine (OC-16; made by OHKAWARA KAKOHKI CO., LTD.) so that a spherical composite particle for electrode composition layer of a positive electrode (electrode composition) having 56 μm of volume average particle size and 93% of sphericity was obtained.

The above mentioned composite particle for electrode composition layer of the positive electrode and the expanded aluminium collector having conductive adhesive layer provided as above were supplied to a roll pressing machine (press cutting rough face heat roll; made by HIRANO GIKEN KOGYO CO., LTD.) so as to conduct roll press forming under a condition of forming speed 20 m/min, roll temperature 100° C., pressing line pressure 3.9 kN/cm, and to perform sequential forming on both surfaces of the collector so that an electrode for lithium ion capacitor of a positive electrode comprising electrode composition layer wherein a thickness of one face is 200 μm was obtained.

A conductive adhesive layer was formed by that a pair of die is provided at a downstream side of a running direction of a collector so as to sandwich an expanded copper collector (ratio of through holes penetrating one side surface to other side surface: 40 area %) having 20 μm of thickness which runs vertically (running direction of the collector is from down to up), the slurry composition for forming said conductive adhesive layer was discharged from the pair of die and coating to the both inside and outside faces of the collector by 30 m/min of forming speed, drying for 5 min at 120° C.

100 parts of graphite having 4 μm volume average particle size (KS-6; made by TIMCAL) as an electrode active material of a negative electrode, 2.0 parts, in terms of solid content, of 1.5% aqueous solution of carboxymethyl cellulose ammonium (DN-800H; made by DAICEL CHEMICAL INDUSTRIES, LTD) as a dispersion agent, 5 parts of acetylene black (DENKA BLACK powder shape; made of DENKI KAGAKU KOGYO KABUSHIKI KAISHA) as a conductive material, 3.0 parts, in terms of solid content, of 40% aqueous dispersion of acrylate polymer (copolymer obtained by emulsion polymerization of 70 parts of 2-ethylhexyl acrylate, 15 parts of acrylonitrile, and 15 parts of itaconic acid) having a glass transition temperature of −12° C. and a number average particle size of 0.25 μm as a binder for electrode composition and ion exchanged water were blended so that a total solid content concentration becomes 35%, a slurry for electrode composition layer of a negative electrode is prepared.

Next, spray dry granulating is performed to this slurry under a condition that a rotation speed 25,000 rpm of a rotation disk type atomizer (65 mm diameter), 150° C. of hot air temperature, 90° C. of a particle recovery port temperature, by using a spray drying machine (OC-16; made by OHKAWARA KAKOHKI CO., LTD.) so that a spherical composite particle for electrode composition layer of a negative electrode (electrode composition) having 28 μm of volume average particle size and 93% of sphericity was obtained.

The above mentioned composite particle for electrode composition layer of the negative electrode and the expanded aluminium collector having conductive adhesive layer provided as above were supplied to a roll pressing machine (press cutting rough face heat roll; made by HIRANO GIKEN KOGYO CO., LTD.) so as to conduct roll press forming under a condition of forming speed 20 m/min, roll temperature 100° C., pressing line pressure 3.9 kN/cm, and to perform sequential forming on both surfaces of the collector so that an electrode for lithium ion capacitor of a negative electrode comprising electrode composition layer wherein a thickness of one face is 100 μm was obtained.

Except for using the above obtained positive electrode and negative electrode for lithium ion capacitor of the negative electrode in Example 1, a lithium ion capacitor was formed as similar with Example 1. A measuring result with respect to each characteristic of the electrode and the lithium ion capacitor was shown in Table 1.

Comparative Example 1

Except for using an expanded aluminium collector having 30 μm thickness wherein conductive adhesive layer is not formed as a collector for positive electrode and an expanded copper collector having 20 μm thickness wherein conductive adhesive layer is not formed as a collector for negative electrode in Example 1, an electrode for lithium ion capacitor and a lithium ion capacitor were produced as similar with Example 1. A measuring result with respect to each characteristic of the lithium ion capacitor was shown in Table 1.

TABLE 1

| | Example 1 | Example 2 | Example 3 | Example 4 | Example 5 | Example 6 | Example 7 | Example 8 | Example 9 | Comparative Example 1 |
|---|---|---|---|---|---|---|---|---|---|---|
| Presence or absence of conductive adhesive layer | | | | | Presence | | | | | Absence |
| Kind of carbon particle (A) | — | Carbon particle A1 | Carbon particle A2 | Carbon particle A3 | Carbon particle A3 | Carbon particle A3 | Carbon particle A3 | Carbon particle A3 | Carbon particle A3 | — |
| Kind of carbon particle (B) | Carbon particle B1 | — | — | — | Carbon particle B1 | Carbon particle B1 | Carbon particle B1 | Carbon particle B1 | Carbon particle B1 | — |
| Electric resistance rate of carbon particle ($\Omega \cdot cm$) | 0.004 | 0.07 | 0.06 | 0.02 | 0.008 | 0.01 | 0.012 | 0.01 | 0.01 | — |
| Weight ratio of carbon particle (A)/(B) | — | — | — | — | 0.11 | 0.25 | 1 | 0.25 | 0.25 | — |
| Forming method of electrode composition layer | | | | Wet forming method | | | | | Dry forming method | Wet forming method |
| Internal resistance ($\Omega$) | 0.12 | 0.15 | 0.13 | 0.12 | 0.08 | 0.06 | 0.1 | 0.03 | 0.02 | 0.25 |
| Durability | B | B | B | B | A | A | A | A | A | C |
| Peel strength of electrode | B | B | B | B | A | A | A | A | A | C |

As it is clear from the above examples and comparative example, in case that the electrode for lithium ion capacitor of the present invention is used, it is possible to make excellent electrode strength, low internal resistance, namely powder density is high and durability can be improved.

On the other hand, the comparative example 1 wherein the conductive adhesive layer does not exist, the internal resistance is high, durability and peel strength of the electrode are deteriorate.

The invention claimed is:

1. An electrode for lithium ion capacitor comprising:
   an electrode composition layer composed of electrode active material, conductive material and a binder, and
   a collector;
   wherein:
   a conductive adhesive layer comprising carbon particles is provided between said electrode composition layer and the collector, and
   said carbon particles comprise carbon particles (A) having a volume average particle size of 0.1 μm or more and 0.5 μm or less, and carbon particles (B) having a volume average particle size of 1 μm or more and 10 μm or less.

2. The electrode for lithium ion capacitor as set forth in claim 1, wherein
   said collector has through holes.

3. The electrode for lithium ion capacitor as set forth in claim 1 or 2, wherein
   said carbon particles are graphite or carbon black.

4. The electrode for lithium ion capacitor as set forth in claim 1, wherein
   an electric resistivity of said carbon particle is 0.0001 to 1 $\Omega \cdot cm$.

5. The electrode for lithium ion capacitor as set forth in claim 1, wherein
   a volume average particle size distribution of said carbon particles is bimodal.

6. The electrode for lithium ion capacitor as set forth in claim 1, wherein
   a weight ratio of said carbon particles (A) and carbon particles (B) is within a range of 0.05 to 1 in proportion of (A)/(B).

7. The electrode for lithium ion capacitor as set forth in claim 1, wherein
   said conductive adhesive layer further comprises (meth)acrylate polymer or diene polymer as a binder for conductive adhesive agent.

8. The electrode for lithium ion capacitor as set forth in claim 7, wherein said conductive adhesive layer comprises a (meth)acrylate polymer obtained by polymerizing a monomer mixture including a compound of general formula (1): $CH_2=CR^1—COOR^2$, wherein $R^1$ is a hydrogen atom or methyl group and $R^2$ is an alkyl group or cycloalkyl group, a polymerizable monomer comprising a carboxylic acid group, and a polymerizable monomer comprising a nitrile group.

9. The electrode for lithium ion capacitor as set forth in claim 8, wherein said monomer mixture comprises 0.5 to 20 parts by weight of the polymerizable monomer comprising a carboxylic acid group and 0.5 to 30 parts by weight of the polymerizable monomer comprising a nitrile group to 100 parts by weight of the compound of general formula (1).

10. A lithium ion capacitor comprising
    a positive electrode, a negative electrode, an electrolyte solution and a separator, wherein
    said positive electrode or negative electrode are the electrode as set forth in claim 1.

11. The electrode for lithium ion capacitor as set forth in claim 1, wherein the electrode composition layer is made of composite particles comprising the electrode active material, conductive material and binder.

12. The electrode for lithium ion capacitor as set forth in claim 1, wherein said conductive adhesive layer further comprises a dispersion agent selected from the group consisting of carboxymethyl cellulose, ammonium salts thereof and alkali metal salts thereof.

* * * * *